United States Patent [19]

Dering

[11] 4,201,911
[45] May 6, 1980

[54] SHAFT ANGLE DIGITIZER

[75] Inventor: Charles R. Dering, Northridge, Calif.

[73] Assignee: Richard M. Glueck, Chappaqua, N.Y.

[21] Appl. No.: 886,667

[22] Filed: Mar. 15, 1978

[51] Int. Cl.² ............................................. G01D 5/38
[52] U.S. Cl. ......................... 250/231 SE; 235/92 MP; 340/347 P
[58] Field of Search .................. 250/231 GY, 231 SE, 250/237 G; 340/347 P, 347 AD; 324/166, 173, 174, 175; 356/169; 235/92 MP, 92 V

[56] References Cited

U.S. PATENT DOCUMENTS

| | | | |
|---|---|---|---|
| 3,122,735 | 2/1964 | Townsend | 235/92 MP X |
| 3,165,730 | 1/1965 | Robinson | 340/347 AD |
| 3,374,477 | 3/1968 | Ejiri et al. | 250/231 SE |

FOREIGN PATENT DOCUMENTS 373748  5/1973  U.S.S.R. ............................... 340/347 P

Primary Examiner—David C. Nelms
Assistant Examiner—Edward P. Westin
Attorney, Agent, or Firm—Horace S. Harper; Eric P. Schellin

[57] ABSTRACT

An analog to digital shaft position digitizer including a pair of driven members where one member with "fine" reference intelligence and increment intelligence thereon is driven at a higher speed than the other member with "coarse" reference intelligence and transfer command intelligence thereon. A photo-optic sensor system picks up the intelligence from the members and by an electronic gating circuit the "fine" and "coarse" reference intelligence pulses are sent to a digital counter to reset the counter while increment intelligence pulses are sent to a clocking line of the counter to provide parallel binary numbers. Transfer command intelligence pulses from the low speed member transfers the parallel binary numbers from the digital counter to an electronic latching circuit to indicate shaft angle displacement of a rotating shaft.

9 Claims, 1 Drawing Figure

U.S. Patent May, 6, 1980 4,201,911
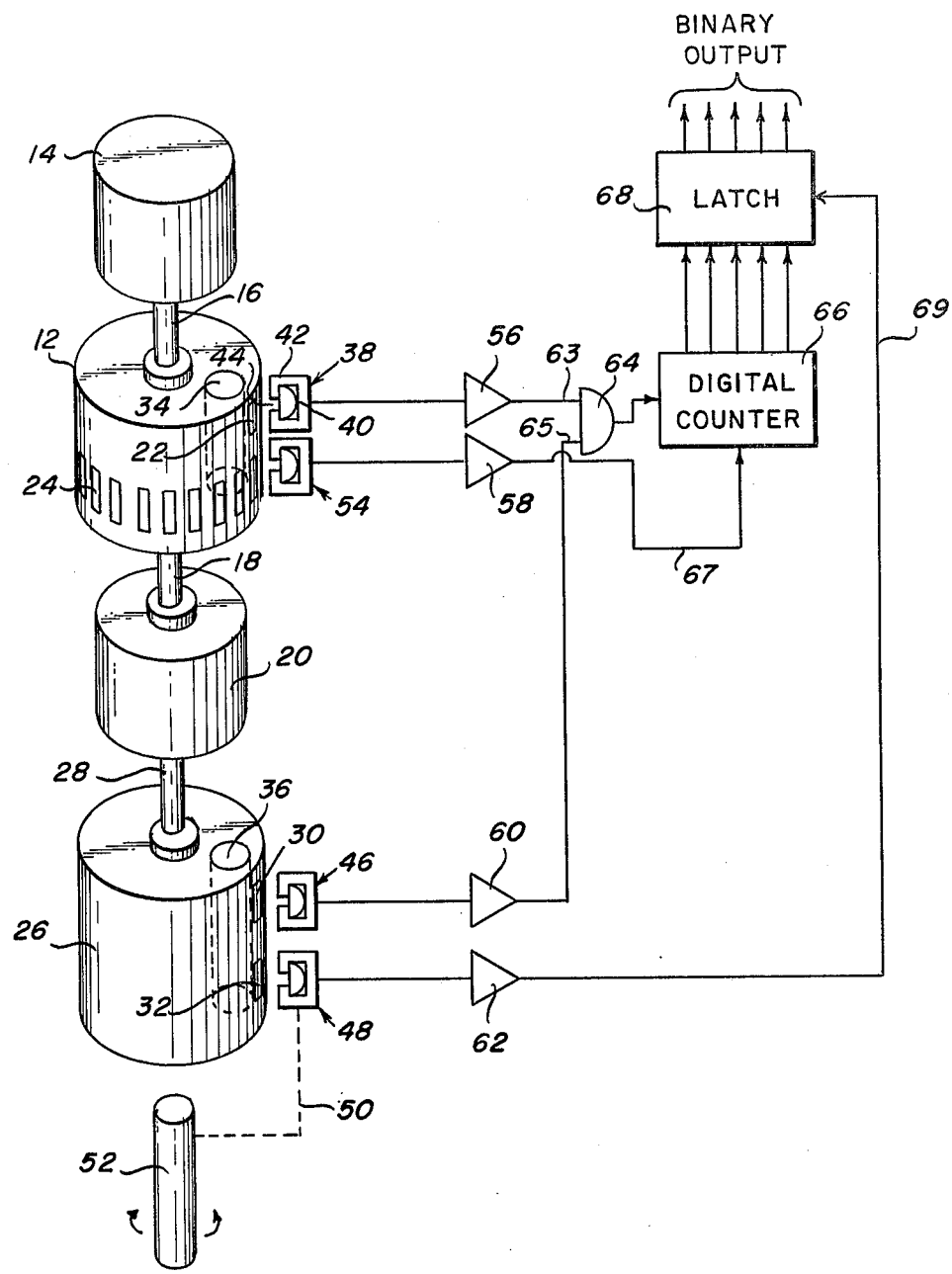

SHAFT ANGLE DIGITIZER

BACKGROUND OF THE INVENTION

This invention relates to digitizers and, more particularly, to digitizers for converting shaft angle to binary numbers.

In recent years an impressive variety of shaft position digitizers have been proposed to satisfy the requirements of high resolution electromechanical systems. There have been great efforts directed to devising methods of increasing the angular resolution of digitizers while, simultaneously, reducing their overall size and weight. The term "resolution" is used here to denote the number of unique binary words provided by the digitizer for 360 degrees of input shaft rotation.

Historically, many digitizers have been devised which employ a single, coded disc or cylinder for converting shaft angle displacement to a binary digital representation of the angular displacement with the requisite resolution. More particularly, in such digitizers the coded element is generally mounted to a rotatable primary shaft, the angular position of which is to be digitized. An exemplary binary code disc has a series of concentric rings, each ring being divided into a number of equal sized units of alternate binary significance. Starting with the innermost ring, the units of which represent the most significant digit of the binary number to be generated, the units of the rings at the greater radial distances from the center of the disc are one-half of the size of the units of the adjacent interior rings. Therefore, the units of each ring at increasingly greater radial distances from the disc center represent a decreasingly less significant digit. The binary number representing the input shaft position is then read from the code disc by a number of sensors, one sensor being individual to each ring. Angular positions of the input shaft are thus converted by the digitizer to unique numbers, one for each definable angular position on the code disc. Obviously, the maximum resolution of this exemplary single disc digitizer is determined by the size of the smallest unit of the outside ring and the ability to accurately and reliably read the smallest unit. To achieve resolutions of a few seconds-of-arc or better with a digitizer employing a single code disc on which the finest units which may be read by conventional methods are positioned at the greatest distance from the center of the disc, the code disc would be too large to be practical for use in most applications. To eliminate such prohibitive size, attempts to achieve better resolution have been centered around the use of least-significant-bit-reading vernier mechanisms and electronic interpolation of least significant bits. Both of these techniques add significantly to the complexity and cost of the digitizer.

Another type of a single coded element digitizer is the subject of U.S. Pat. Nos. 3,168,643 and 3,165,730, issued to Robinson. The Robinson patents disclose single, motor-driven coded discs or cylinders for digitizing preselected functions which vary with a shaft position. While the use of a motor driven coded element provides absolute or whole-word information from a single code ring, it does not achieve the higher resolution so often needed in todays industry.

Yet another type of a single coded element digitizer is the subject of U.S. Pat. No. 3,831,169, issued to Raser. The Raser patent disclosed a single, motor-driven vane for digitizing shaft angles. While theoretically, this patent offers an improvement in resolution, in practice it is limited by the necessity of a constant speed drive motor and a fixed frequency square-wave oscillator, for if the motor speed varied or if the oscillator frequency drifted, gross digitizing errors could result. Another method used to increase resolution is the use of multi-stage digitizers with mechanical speed increasers connected to the input shaft. These digitizers usually consist of a two stage disc encoding mechanism which has a second coded disc that is gear driven at a slower rate than the first so that the binary output word is achieved in many revolutions of the input shaft. More particularly, in such digitizers the first code disc might produce 256 binary counts for 360 degrees of input shaft rotation and the second code disc might produce 32 counts for 360 degrees of rotation. By coupling these discs thru a 32 to 1 speed reducer, the digitizer would provide 8192 binary counts for 32 turns of the input shaft. In digitizer terminology, this exemplary device would be said to have a resolution of 8 bits and a capacity of 13 bits in 32 turns of the input shaft. The resolution of this device could be increased to 13 bits by connecting a mechanical speed increaser with a ratio of 1 to 32 to the input shaft of the digitizer. While the resolution of multi-stage digitizers is, theoretically, increased, concomitant increases in size and weight of the devices, together with serious gear induced inaccuracies, limit the actual resolution attainable. Most particularly, tooth spacing errors on the gears, gear backlash and a relatively large inertia reflected to the input shaft are problems which generally preclude the use of gear-coupled devices. The present state-of-the-art on multi-stage digitizers included U.S. Pat. Nos. 3,419,727 issued to Pabst; 3,808,431 issued to Hedrick, and 3,525,094 issued to Leonard. All of these referenced multi-stage digitizers could be coupled to the primary input shaft thru a speed increaser to increase resolution but the practical resolution achievable would again be limited by the gearing errors previously described.

The present invention contemplates an analog-to-digital shaft angle digitizer which eliminates these limited resolution capabilities of the prior art devices.

SUMMARY OF THE INVENTION

One object of the invention is to provide a digitizer which converts shaft angle displacement to a digital number with a high degree of resolution and accuracy.

Another object of the invention is to provide a digitizer which operates independently of digitizer drive motor speed.

Another object of the invention is to provide a digitizer which is simple in design and may be readily mass produced.

Another object of the invention is to provide a digitizer in which intelligence may be encoded on a cylinder or disc or any other suitable device.

According to the invention, there is provided a high speed opaque coded cylinder rotated by a motor, a mechanical speed reducer and a low speed opaque coded cylinder rotated by the speed reducer. The high speed opaque coded cylinder has intelligence thereon in the form of a short, transparent "fine" reference line and a series of short, transparent increment lines equally spaced about the circumference of the cylinder. The low speed opaque coded cylinder also has intelligence thereon in the form of a short, transparent "coarse" reference line and a short, transparent transfer command line. The interior of cylinders may be illuminated in any suitable manner and in the present embodiment elongated light sources and are positioned within cylinders.

Fixed photoelectric pick-ups are positioned adjacent the cylinders and aligned with the reference intelligence lines to transmit light from the illumination source to the pick-up photocells when the reference intelligence lines are coincident with the pick-ups.

Another pick-up is attached to an input shaft to be measured and positioned adjacent to the low speed cylinder and aligned with the transfer command intelligence line to transmit light to the pick-up photocell when the transfer command intelligence line is coincident with the pick-up.

As the cylinders rotate the reference intelligence and the adjacent pick-ups are used to produce a coincident pulse and the transfer command intelligence and the adjacent pick-up are used to produce a transfer command pulse.

One transfer command pulse and one "coarse" reference pulse is produced for each revolution of the low speed cylinder with the spacing between the pulses varying with the angular position of an input shaft. A "fine" reference pulse is produced for each revolution of the higher speed cylinder. The ratio of the speed reducer controls the number of "fine" reference pulses to "coarse" reference pulses.

By providing transparent increment lines on the higher speed cylinder and a photoelectric pick-up the adjacent to cylinder the digitizer can be made independent of the motor speed since the spacing between the coincident reference pulse and the transfer command pulse is measured by the increment pulses and not as a time interval.

The coincident pulse is used in a digital counter to reset the counter each time the "fine" and "coarse" pulses are in coincidence. The increment pulses provide a parallel binary number in the counter which is transferred to a latch by the transfer command pulse where it is stored. With this arrangement the angular position of an input shaft is represented by the binary number stored in the latch and is updated with each revolution of the low speed cylinder.

DESCRIPTION OF THE DRAWING

Other objects and advantages of this invention will become apparent from the following detailed description thereof and the accompanying drawing wherein:

FIG. 1 is a schematic diagram of a novel digitizer constructed according to the invention.

DESCRIPTION OF THE PREFERRED EMBODIMENTS

Referring now to the drawing, there is shown an analog-to-digital digitizer which includes an opaque cylinder 12 rotated by a drive motor 14 by a shaft 16 and connected to the opaque cylinder 12 by an output shaft 18 is a speed reducer 20. A second opaque cylinder 26 is rotated by an output shaft 28 of the speed reducer 20.

The opaque cylinder 12 has intelligence thereon in the form of a short transparent "fine" reference line 22 and a series of short, transparent increment lines 24, which are equally spaced about the circumference of the cylinder 12.

The number of transparent increment lines 24 on cylinder 12 is a function of the desired measurement resolution, but the number of lines alone do not determine the resolution of the digitizer. The resolution of the digitizer is determined by:
 a. The number of increment lines 24 on cylinder 12.
 b. The ratio of speed reducer 20.
For example:
 If cylinder 12 had 1000 increment lines 24 and the reduction ratio of speed reducer 20 was 10 to 1, the resolution of the digitizer would be 10,000 counts for 360 degrees of rotation of input shaft 52. Similarly, if cylinder 12 had 1000 increment lines 24 and the ratio of speed reducer 20 was 100 to 1, the resolution of the digitizer would be 100,000 counts for 360 degrees of rotation of input shaft 52.
 In other words, it's the number of increment lines 24 on cylinder 12 multiplied by the ratio of speed reducer 20 that determines the resolution of the digitizer.

The opaque cylinder 26 also has intelligence thereon in the form of a short, transparent "coarse" reference line 30 and a short, transparent transfer command line 32. While the "coarse" reference line 30 and the transparent command line 32 are shown on the cylinder 26 in an in-line relationship it should be understood that this is only an illustration of the positioning of lines 30 and 32 and that other positions will work equally well.

Opaque cylinders 12 and 26 are made of any light transmissable medium such as crown glass, where the intelligence may be photographically laid on the cylinders. Other opaque materials may be used just so the opaque regions block the transmission of light and the only transmitted light is through the transparent lines. This manner of encoding the cylinders is preferably conventional.

The interior of opaque cylinders 12 and 26 may be illuminated in any suitable manner and in the present embodiment elongated light sources 34 and 36 are positioned within the cylinder 12 and 26, respectively.

A fixed photoelectric pick-up 38 is positioned adjacent opaque cylinder 12 and is aligned with the "fine" reference line 22. The pick-up preferably used includes a photocell 40 enclosed within a shield 42 having a small aperture 44 therein adjacent the cylinder 12 to transmit light from illumination source 34 to photocell 40 when the "fine" reference line 22 of cylinder 12 is coincident with aperature 44, which occurs once per each revolution of cylinder 12.

A second fixed photoelectric pick-up 46, similar to photoelectric pick-up 38, is positioned adjacent to opaque cylinder 26. Photoelectric pick-up 46 is aligned with the "coarse" reference line 30 of cylinder 26 to transmit light from illumination source 36 to the photocell 40 of the pick-up 46 when the "coarse" reference line 30 is coincident with the aperature 44, which occurs once per each revolution of cylinder 26.

There is a third photoelectric pick-up 48, similar to photoelectric pick-up 38 positioned adjacent to opaque cylinder 26 and aligned with transfer command line 32 to transmit light from illumination source 36 to photocell 40 when the transfer command line 32 is coincident with aperature 44 once per each revolution of cylinder 26. Photo-electric pick-up 48 is affixed by mechanical means, shown as a dashed line 50, to the input shaft 52 and is rotatably positionable about the circumference of opaque cylinder 26. It is the rotational angular position of shaft 52 that is being measured by digitizer 10.

It should be understood that opaque cylinders 12 and 26 rotate at different speeds since speed reducer 20 connects cylinder 12 to cylinder 26. Therefore cylinder 12 which is directly driven by drive motor 14 rotates at a higher speed than cylinder 26 and the speed of cylinder 26 is reduced by the ratio of the speed reducer 20. The speed reducer 20 is of the standard type which will reduce the speed in the order of 10 to 1, 16 to 1, 20 to 1, 32 to 1 or some other selected ratio depending on the increment lines on cylinder 12 and the desired number of counts per revolution of the input shaft, as mentioned above. As opaque cylinders 12 and 26 rotate, a "fine" reference pulse is produced by pick-up 38 each time "fine" reference line 22 passes pick-up 38, a "coarse" reference pulse is produced by pick-up 46 each time "coarse" reference line 30 passes pick-up 46 and a transfer command pulse is produced by pick-up 48 each time transfer command line 32 passes pick-up 48. One transfer command pulse and one "coarse" reference pulse is produced for each revolution of cylinder 26 with the spacing between the pulses varying with and determined by the angular position of input shaft 52. An example of the spacing between the "coarse" reference pulse and the transfer command pulse would be where cylinder 26 rotates at two revolutions per second and input shaft 52 is positioned 180 degrees from the digitizers zero position. (I.E. 180 degrees from where the transfer command pulse and "coarse" reference pulse are in coincidence). In this example the pulses would be one second apart. Another example would be where cylinder 26 rotates at two revolutions per second and input shaft 52 is positioned 45 degrees from the zero position. In this example the pulses would be 0.25 seconds apart. A "fine" reference pulse is produced for each revolution of cylinder 12. The ratio between the number of "fine" reference pulses and "coarse" reference pulses is dependent on the ratio of speed reducer 20. Therefore, for example, a speed reducer with a ratio of 32 to 1 will rotate cylinder 26 once for every thirty-two revolutions of cylinder 12 and thirty-two "fine" reference pulses will be produced for every one "coarse" reference pulse.

It is possible to measure the interval between the "coarse" reference pulse and the transfer command pulse by use of a constant speed motor and a fixed frequency oscillator. However, the accuracy of the shaft angle digital information would depend on there being no variation in the motor speed nor in the oscillator frequency.

The present digitizer 10 is independent of motor speed and therefore achieves higher resolution and accuracy. Cylinder 12 is provided with transparent increment lines 24 equally spaced about the circumference of the cylinder. A fixed photoelectric pick-up 54, similar to pick-up 38, is aligned with the increment lines 24 and adjacent to cylinder 12 to transmit light from illumination source 34 to the photocell each time an increment line 24 is coincident with the aperature so that a pulse is produced each time an increment line 24 passes pick-up 54. With this arrangement the accuracy of the digitizer does not depend on the uniform speed of rotation of motor 14 because the spacing of the coincident zero pulse output of the "fine" reference pulse and the "coarse" reference pulse, and the transfer command pulse output is measured by the increment pulses and not as a time interval.

The pulses from pick-ups 38, 54, 46 and 48 are amplified by amplifiers 56, 58, 60 and 62, respectively. The amplified "fine" and "coarse" reference pulses from amplifiers 56 and 60 are applied to the inputs 63 and 65 of AND gate 64. The output from AND gate 64 is connected to the reset line of a digital counter 66 which resets the counter each time the "fine" reference pulse and the "coarse" reference pulse is in coincidence. The "fine" reference pulse and the "coarse" reference pulse must be in coincidence because any attempt to reset counter 66 with one or the other would present inherent problems: The counter 66 cannot be reset with the "fine" reference pulses alone since resetting would occur once for every revolution of cylinder 12, whereas it is required to reset the counter once for each revolution of cylinder 26. The counter 66 cannot be reset with the "coarse" reference pulse alone because it is too coarse. These problems are solved by using AND gate 64 to select one and only one of the "fine" reference pulses. The amplified increment pulses from amplifier 58 are applied to the clock pulse line 67 and increment the counter to provide a parallel binary number in the counter. The amplified transfer command ulse from amplifier 62 is applied to the strobe line 69 of latch 68 so that the parallel binary number that is in digital counter 66 at the time of the transfer command pulse is transferred to and stored in latch 68. With the arrangement described the angular position of input shaft 52 is represented by the binary number stored in latch 68 and is updated with each revolution of cylinder 26.

From the foregoing it will be recognized by those skilled in the art that the present invention provides remarkable improvements in accuracy, simplicity of operation, resolution and circuit design in a digitizing apparatus which converts the rotational position of a shaft into a binary word.

Although one embodiment of the invention has been illutrated and described in detail, it is to be expressly understood that the invention is not limited thereto. Various changes may be made in the design and arrangement of parts without departing from the scope and spirit of the invention as the same will be understood by those skilled in the art. While in the embodiments shown a cylinder contains the intelligence, in some instances it may be desirable to have the intelligence on a disc. Also instead of using photoelectric pick-ups responsive to transparent lines as described herein, capacitive or inductive sensing may be used inscribing the reference, transfer command increment lines as magnetic material and using capacitive or inductive pick-ups to detect the passage of a line and provide corresponding pulses.

What is claimed is:
1. An angle measuring apparatus comprising a system of rotating devices having at least two rotating devices of an opaque material having intelligence encoded thereon;

a motor causing a first rotating device to turn;
    a first speed reducer connecting said first rotating device to said second rotating device causing said second rotating device to turn at a slower speed then said first rotating device;
    a first reference intelligence line encoded on said first rotating device;
    a second reference intelligence line encoded on a rotating device other than said first rotating device;
    a plurality of equally spaced increment intelligence lines encoded on said first rotating device;
    a transfer command intelligence line encoded on said second rotating device;

a first photoelectric pick-up means aligned for scanning said first reference intelligence line on said first rotating device to produce an electrical pulse;

a second photoelectric pick-up means aligned for scanning said second reference intelligence lines on said second rotating device to produce an electrical pulse;

a third photoelectric pick-up means aligned for scanning said increment intelligence lines on said first rotating device to produce electrical pulses.

a fourth photoelectric pick-up means positioned for rotation about said second rotating device and to vary the angle between said second reference line and said transfer command line and aligned for scanning said transfer command intelligence line of said second rotating device to produce an electrical pulse;

amplifiers for amplfiying the electrical pulses produced by scanning said first reference intelligence line, said second reference intelligence line; said increment intelligence lines and said transfer command line;

an electronic means for receiving the input pulses from said first and second reference intelligence lines, and sending a coincident zeroing pulse;

a clocking circuit having an amplifier for sending said increment pulses as clocking pulses;

a digital counter for receiving said zeroing pulse to reset said digital counter and for receiving said clocking pulses to provide a parallel binary number;

a transfer command pulse electrical circuit;

an electronic latch means connected to said transfer command pulse electrical line to store the parallel binary numbers from said digital counter where only those said clocking pulses received by said digital counter between the coincident zeroing pulse and said transfer command pulse are transferred as parallel binary numbers representing the angular displacement of an input shaft.

2. The angle measuring apparatus as claimed in claim 1 wherein said rotating devices are cylinders.

3. An angle measuring apparatus as claimed in claim 1 wherein said first reference intelligence line is a "fine" reference line, and said second reference intelligence line is a "coarse" reference line.

4. The angle measuring apparatus as claimed in claim 3 wherein said system of rotating devices has a first cylinder, having said first reference line and said increment lines, and a second cylinder having said second reference line and said transfer command line.

5. An analog-to-digital encoder comprising:

a first rotating member having "fine" reference intelligence thereon;

a first pick-up means for scanning the "fine" reference intelligence and providing a "fine" reference signal;

a second rotating member mechanically connected to the first rotating member having "coarse" reference and transfer command intelligence thereon;

a speed reducer mechanically connected to the first member and to the second member to rotate the second member at a lower speed than the first member;

second and third pick-up means for scanning the "coarse" reference and transfer command intelligence and providing "coarse" reference and transfer command signals where the third pick-up means is connected to a means responsive to angular rotation to move the third pick-up to vary the angle between the "coarse" reference and transfer command signals in accordance with the shaft position and means for measuring the angle;

a counting means connected to the pick-up means providing the "fine" and coarse" reference intelligence to reset the counting means; and a storage means connected to the counting means responsive to the transfer command signal to provide an output corresponding to the angular position of the input shaft.

6. An analog-to-digital shaft position digitizer as claimed in claim 5 wherein said first rotating member has equally spaced increment intelligence thereon, and a fourth pick-up means for scanning the increment intelligence to provide an output for measuring the angle.

7. An analog-to-digital encoder as claimed in claim 6 wherein the counting means is connected to the pick up means providing the "fine" and "coarse" reference intelligence by an "AND" gate, and where the coincidence of the "fine" and "coarse" reference pulses resets the counting means.

8. An analog-to-digital encoder as claimed in claim 6 wherein the storage means is connected to a line that is connected to the transfer command pulse where a binary number is transferred from the counting means to the storage means when a pulse from the transfer command pick-up signals the storage means.

9. An analog-to-digital encoder as claimed in claim 7 wherein the storage means is connected to a strobe line that is connected to the transfer command pulse where a binary number is transferred from the counting means to the storage means when a pulse from the transfer command pick-up signals the storage means.

* * * * *